(12) United States Patent
Je et al.

(10) Patent No.: US 11,996,022 B2
(45) Date of Patent: May 28, 2024

(54) PROVIDING CONTENTS ON A PLURALITY OF DISPLAY DEVICES

(71) Applicant: LG ELECTRONICS INC., Seoul (KR)

(72) Inventors: Seonguk Je, Seoul (KR); Hyunduk Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/035,586

(22) Filed: Sep. 28, 2020

(65) Prior Publication Data
US 2022/0059000 A1    Feb. 24, 2022

(51) Int. Cl.
*G09G 3/20* (2006.01)
*H04N 21/422* (2011.01)

(52) U.S. Cl.
CPC ......... *G09G 3/20* (2013.01); *H04N 21/42204* (2013.01); *G09G 2320/08* (2013.01); *G09G 2330/02* (2013.01); *G09G 2354/00* (2013.01); *G09G 2370/12* (2013.01); *G09G 2370/16* (2013.01)

(58) Field of Classification Search
CPC ........... H04N 21/2221; H04N 21/4122; H04N 21/4263; H04N 21/43615; H04N 21/43635; H04N 21/43637; H04N 21/4382; H04N 21/4398; H04N 21/440218; H04N 21/6112
See application file for complete search history.

(56) References Cited

U.S. PATENT DOCUMENTS

| | | | |
|---|---|---|---|
| 9,681,183 B1 | 6/2017 | Majid | |
| 2012/0162536 A1* | 6/2012 | Sibilsky | H04N 21/41265 348/734 |
| 2013/0081089 A1 | 3/2013 | Kim et al. | |
| 2013/0141331 A1* | 6/2013 | Shiu | G09G 5/003 345/158 |
| 2015/0319473 A1* | 11/2015 | Farkash | H04N 21/2385 725/45 |
| 2016/0077573 A1 | 3/2016 | Lee et al. | |
| 2017/0075641 A1* | 3/2017 | Kwon | G06F 3/0227 |

OTHER PUBLICATIONS

European Patent Office Application Serial No. 20216897.7, Search Report dated Apr. 13, 2021, 7 pages.

* cited by examiner

*Primary Examiner* — Ram A Mistry
(74) *Attorney, Agent, or Firm* — LEE, HONG, DEGERMAN, KANG & WAIMEY

(57) ABSTRACT

Disclosed are a first display device including a wireless communication interface configured to communicate with a second display device, a display, and a controller configured to transmit data on specific content to the second display device when a user command corresponding to output of the specific content is received by the second display device through the wireless communication interface, and a second display device including a wireless communication interface configured to communicate with the first display device, a display, and a controller configured to transmit specific content to the display when data on the specific content is received from the first display device through the wireless communication interface.

13 Claims, 10 Drawing Sheets

PROVIDING CONTENTS ON A PLURALITY OF DISPLAY DEVICES

CROSS-REFERENCE TO RELATED APPLICATIONS

Pursuant to 35 U.S.C. § 119(a), this application claims the benefit of earlier filing date and right of priority to Korean Patent Application No. 10-2020-0105517, filed on Aug. 21, 2020, the contents of which are hereby incorporated by reference herein in its entirety.

BACKGROUND OF THE INVENTION

1. Field of the Invention

The present disclosure relates to a display device and a system, and more particularly, to a first display device and a second display device electrically connected, and a system including the first display device and the second display device.

2. Discussion of the Related Art

A display device is a device having a function of receiving, processing, and displaying an image which a user is able to watch. The display device receives, for example, a broadcast signal selected by the user among broadcast signals transmitted from a broadcasting station, separates an image signal from the received signal, and displays the separated image signal on a display.

As broadcast technology and network technology have been developed and external devices (for example, broadcasting stations, set-top boxes, DVD devices, and other networks) which can interwork with display devices have been developed in recent years, the range of image data that display devices are able to output is increasing. That is, the display devices have been developed to provide not only real-time broadcasts but also various pieces of content to users.

As the spread of display devices has become more common as described above, users frequently use a plurality of display devices.

Meanwhile, in order for a display device to output real-time broadcasts or image data received from an external device, each display device may need to be connected to a device that provides image data to receive data.

That is, each display device has to be directly connected to an external device, or be separately equipped with a receiver for receiving a broadcast signal.

Accordingly, there is a problem in that a display device not connected to a device providing image data cannot output content without a separate connection.

SUMMARY OF THE INVENTION

An object of the present disclosure is to output content to another display device by using a first display device that receives the content from an external device or a broadcasting station.

An object of the present disclosure is to input a specific command to a display device that is not connected to an external device that provides content or a broadcasting station, and provide content on which a specific command is performed through a first display device that receives content from the external device or the broadcasting station to a user through a second display device.

The present disclosure includes a plurality of display devices, and a first display device among the plurality of display devices include a wireless communication interface that communicates with a second display device among the plurality of display devices, a display, and a controller that transmits data on specific content to the second display device when a user command corresponding to output of the specific content is received in the second display device through the wireless communication interface.

The specific content may include real time broadcast data, HDMI, image data input from any one of Composite and Component.

The specific content may include first content and second content, the controller may allocate the first content to a main path and allocate to the second content to a sub-path and data on the second content allocated to the sub-path when the user command corresponding to output of the second content is received in the second display device through the wireless communication interface in a case where the first content is output through the display.

Further, the controller of the first display device may output the first content allocated to the main path through the display, and simultaneously transmit the second content allocated to the sub-path to the second display device to support the second display device such that the second display device outputs the second content.

Further, the controller may switch to an active-stanby state when a Wake on Lan signal is received from the second display device through the communication interface in a case in which the first display device is in a cold-stanby state.

Further, the cold-stanby state may be a state of capable of receiving only a command for turning on/off a power supply of the first display device through the communication interface.

Further, the active-stanby state may mean a state in which all operations is able to be performed while the display is being maintained in in an off state, The controller of the first display device may apply an operation corresponding to the specific operation to the specific content and transmit the specific content on which the specific operation is performed to the second display device when the user command corresponding to the specific operation is received from the second display device through the communication interface.

The specific operation may include channel switching, volume change, and specific content change.

A second display device according to an embodiment of the present disclosure may include a wireless communication interface that communicates with another display device;

a display and a controller that outputs specific content through the display when data on the specific content is received from the first display device through the wireless communication interface.

Further, the controller of the second display device may output a list of specific content receivable by the first display device through the display, and request data on the second content to from first display device through the wireless communication interface when the user command corresponding to output of the second content of the list of specific content is received.

wherein the controller of the second display device may output the second content based on the data on the second content when the data on the second content is received through the wireless communication interface.

The controller of the second display device may transmit a user command corresponding to the specific operation to the first display device through the communication interface and output data on the specific content on which the specific operation is performed when the user command corresponding to the specific operation is received through a user input interface in a case in which the specific content is output through the display.

Further, the controller of the second display device may identify whether the second display device is connected to the first display device, and output a connection failure notification through the display when a state of not being connected to the first display device continues for more than a preset time.

According to an embodiment of the present disclosure, a method of operating a system including a first display device providing specific content and a second display device connected to the first display device may include receiving, by the first display device, a user command corresponding to output of the specific content to the second display device, and transmitting, by the first display device, data on the specific content to the second display device to support the second display device such that the second display device outputs the specific content.

The method may further include outputting, by the first display device, first content of the specific content, receiving, by the first display device, a user command corresponding to output of second of second content of the specific content from the second display device, allocating, by the first display device, the first content to a main path and the second content to a sub-path and transmitting, by the first display device, data on the second content allocated to the sub-path to the second display device to support the second display device such that the second display device outputs the second content.

The method may further include receiving, by the first display device, a user command corresponding to a specific operation from the second display device, applying, by the first display device, an operation corresponding to the specific operation; and transmitting, by the first display device, the specific content on which the specific operation is performed to support the second display device such that the second display device outputs the specific content on which the specific operation has been performed.

Further, the method may further include receiving, by the second display device, receiving data on the specific content and outputting the specific content.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
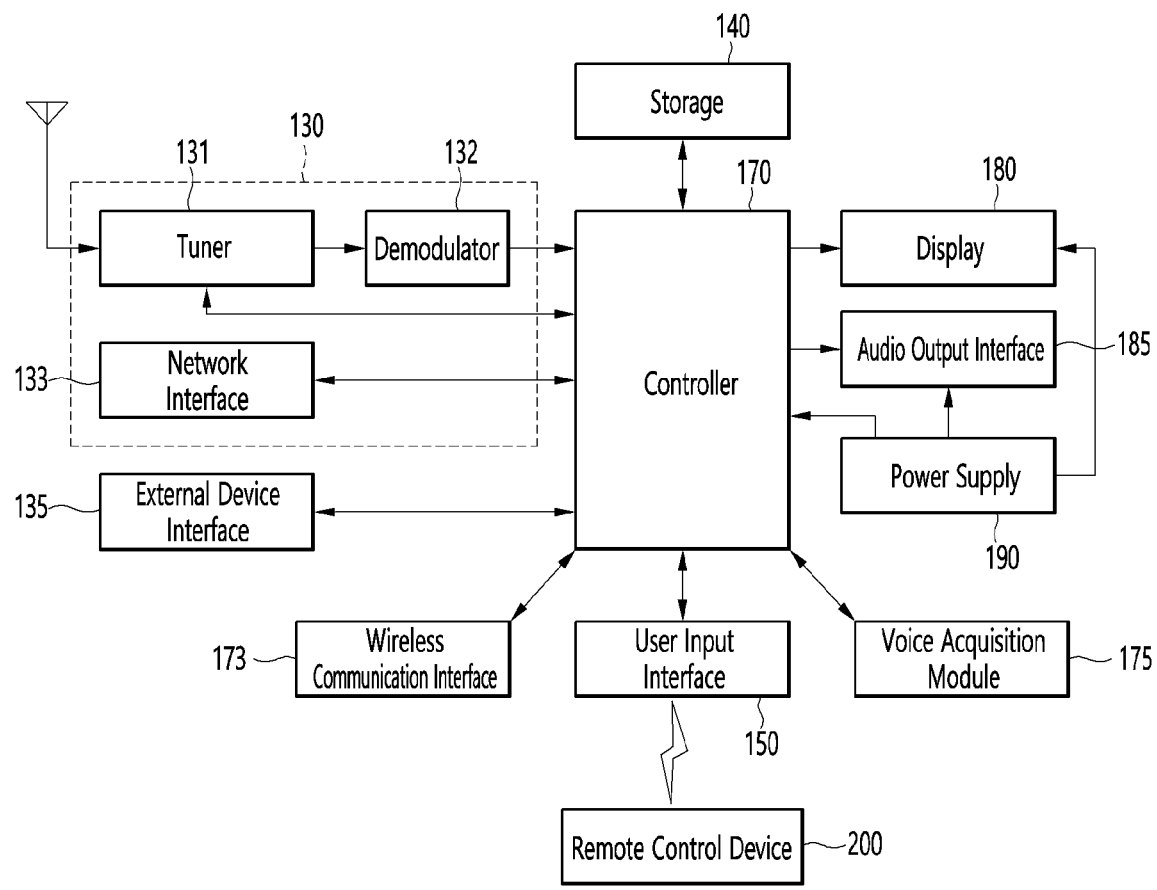
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
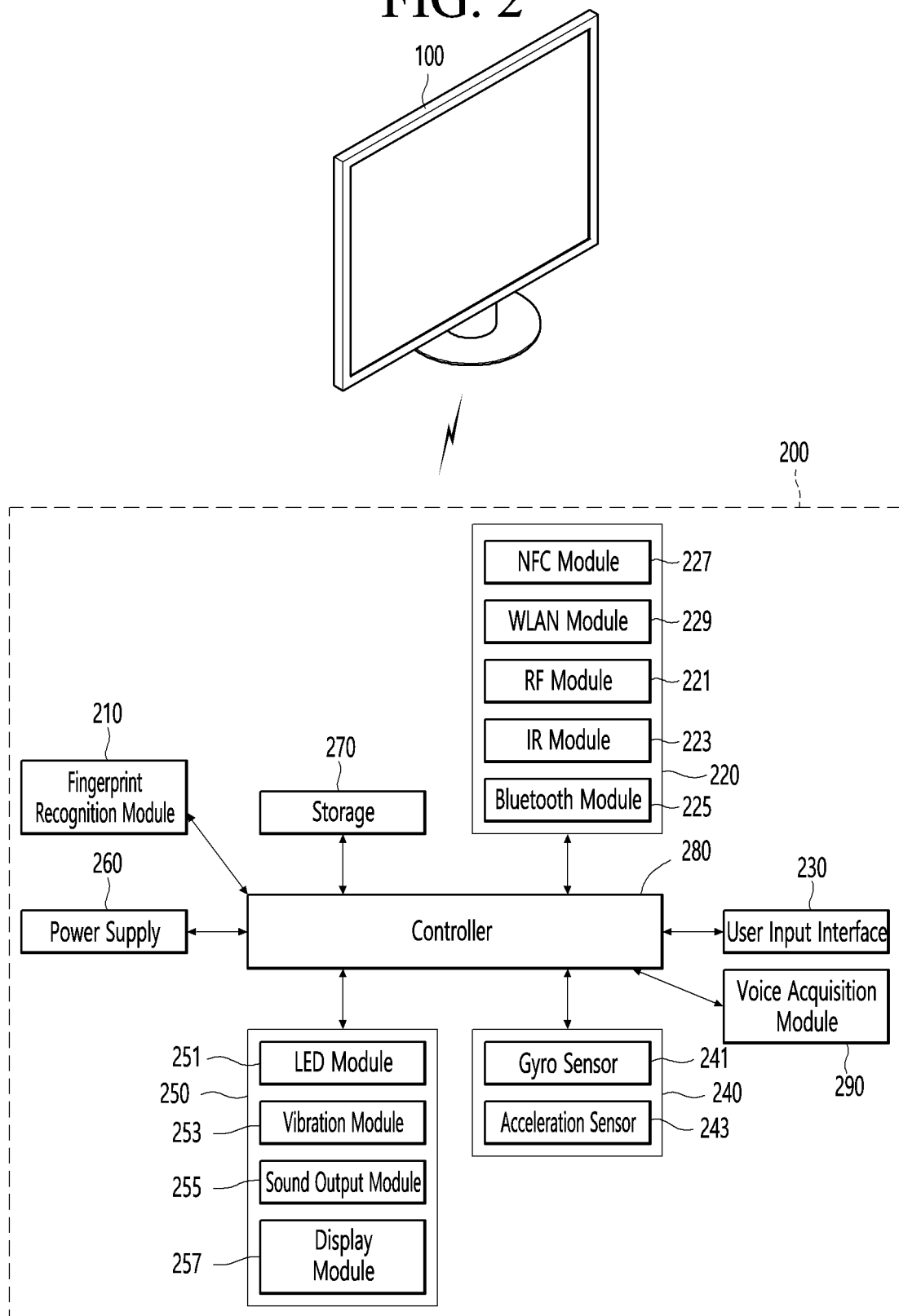
FIG. 2 is a block diagram illustrating a remote control device according to an embodiment of the present disclosure.
Figure 3:
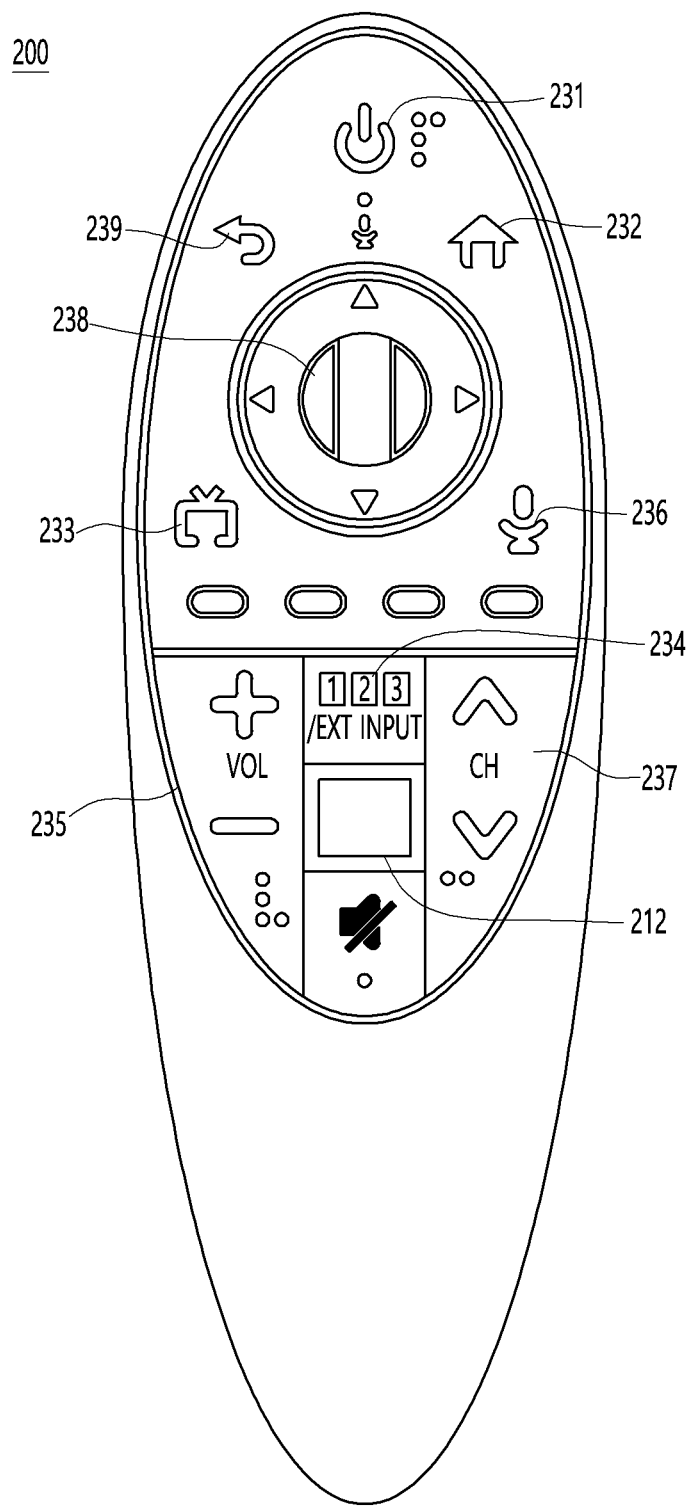
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
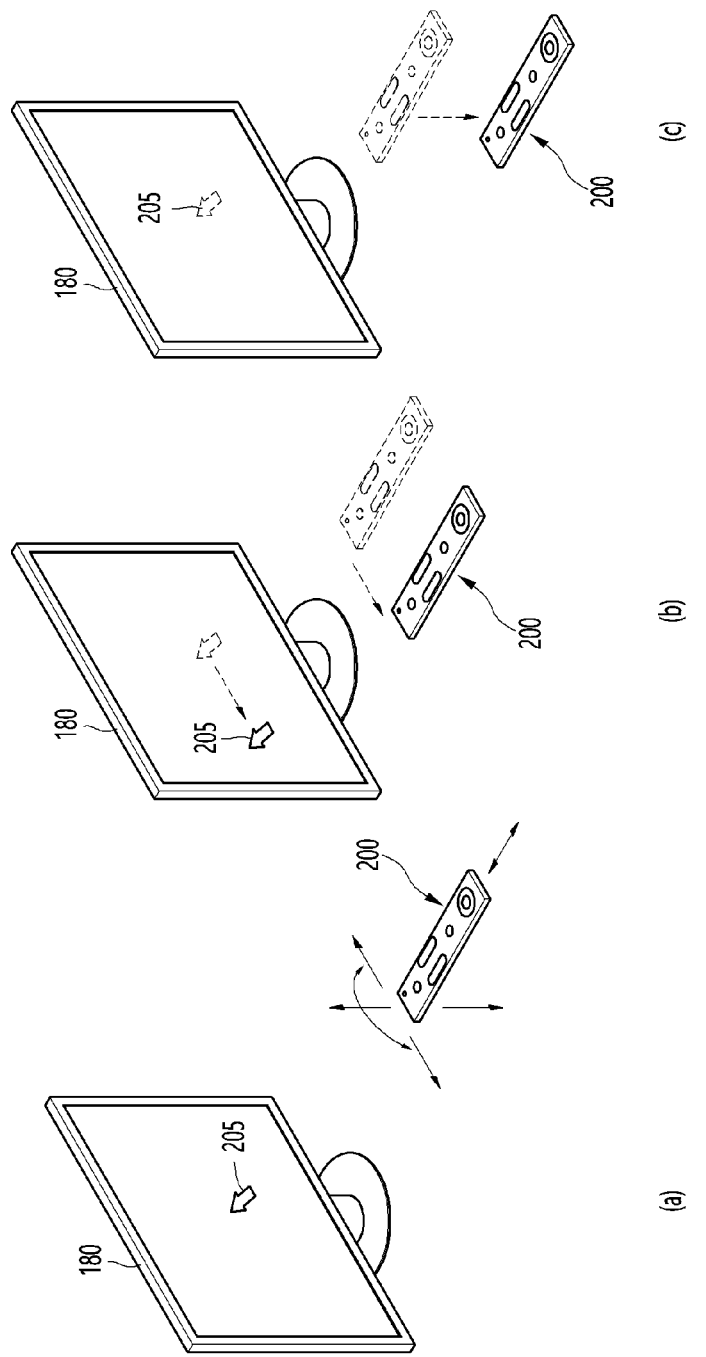
FIG. 4 is a view of utilizing a remote control device according to an embodiment of the present disclosure.

Then, FIG. 4 is described.

FIG. 4 is a view of utilizing a remote control device according to an embodiment of the present disclosure.

FIG. 4A illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

First, a control system of the present disclosure may include a plurality of display devices. Hereinafter, the first display device 101 and the second display device 102 are used for convenience in order to describe the embodiments of the present disclosure, which are for illustration only and do not limit the configuration of the control system of the present disclosure.

The first display device 101 and the second display device 102 of the present disclosure may include the configuration of the display device 100 and may interact with a remote control device 200.

In the following reference numerals, for convenience, the configuration of the first display device 101 is indicated by adding "_1" to the reference numeral of the display device 100, and the configuration of the second display device 102 is indicated by reference numeral adding "_2" to the reference numeral of the display device 100.

In addition, the control system of the present disclosure may further include a server 103 (not shown) that electrically connects the first display device 101 and the second display device 102.

The server 103, the first display device 101, and the second display device 102 may communicate through wired or wireless communication.

The communication technology used by the communication devices 101 and 102 and the server 103 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

Meanwhile, it may be also possible for the first display device 101 and the second display device 102 to communicate directly without passing through a server.

The first display device 101 of the present disclosure may be connected to a broadcasting station and may select a specific broadcasting channel through a tuner 131 according to a channel selection command. The tuner 131 may receive a broadcast signal for the selected specific broadcast channel.

In addition, the network interface 133 of the first display device 101 may transmit or receive data to or from other users or other electronic devices through a connected network or another network linked to the connected network.

In addition, since the external device interface 135 of the first display device 101 is directly connected to an external device, an image signal received from the external device may be output through the display 180.

A voice signal of the external device input through the external device interface 135 may be output through audio output interface 185.

Meanwhile, although the second display device 102 of the present disclosure includes the configuration of the display device 100, the second display device 102 may not be connected to a broadcasting station, a network, or an external device.

Figure 5:
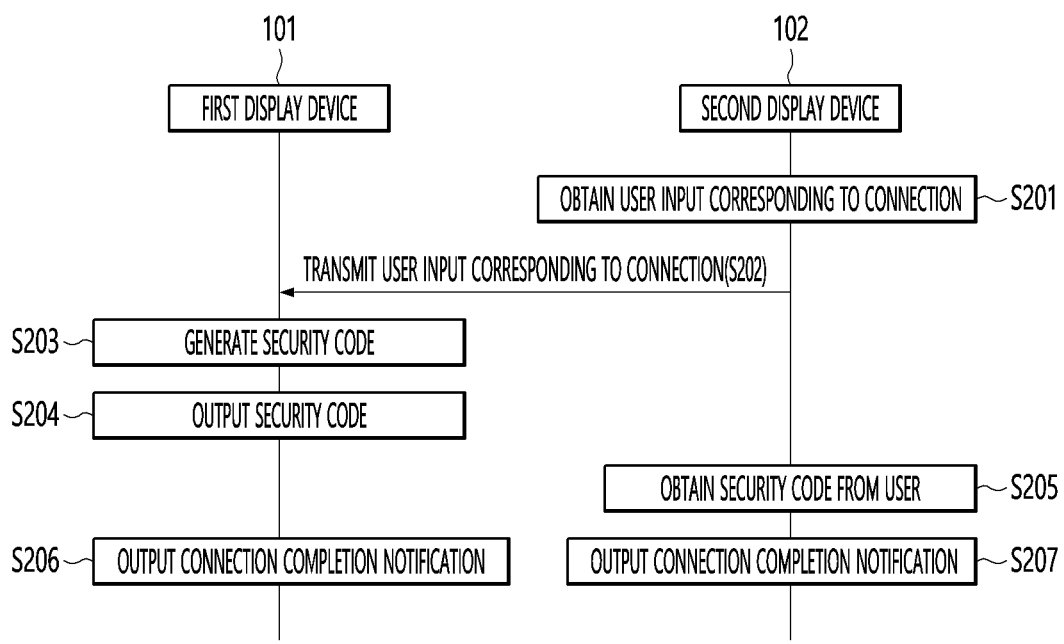
FIG. 5 is a flowchart showing a connection process of a display device according to an embodiment of the present disclosure.

FIG. 5 is a flowchart showing a connection process of a display device according to an embodiment of the present disclosure.

Referring to FIG. 5, in order to connect the first display device 101 and the second display device 102, a "user input corresponding to connection" may be obtained by the second display device 102 (S201).

Specifically, the "user input corresponding to connection" may be transmitted to the second display device 102 in such a way that a user inputs a button corresponding to connection using the remote control device 200. The button corresponding to connection may be made by inputting a predetermined button through a remote control device 200.

In addition, the user may directly input the "button corresponding to connection" through the user input interface 150 included in the second display device 102. Likewise, the button corresponding to connection may be provided in the second display device 102 in advance.

The second display device 102 may transmit a user input corresponding to connection to the first display device 101 through a wireless communication interface 173_2 (S202).

The first display device 101 may receive the "user input corresponding to connection" transmitted from the second display device 102 through a wireless communication interface 173_1.

When the first display device 101 obtains the user input corresponding to connection, the first display device 101 may generate a security code according to a connection request (S203).

In addition, the first display device 101 may output the generated security code through a display 180_1 (S204).

The user may identify the security code output to the display 180_1 of the first display device 101 and input the security code to the second display device 102.

The second display device 102 may receive a security code from a user (S205).

When the security code received by the second display device 102 matches a security code output by the first display device 101, the first display device 101 and the second display device 102 may be electrically connected to each other.

The first display device 101 and the second display device 102 may output a connection completion notification through the displays 180_1 and 180_2 respectively (S206).

Meanwhile, when the first display device 101 and the second display device 102 are electrically connected, the second display device 102 may receive image data from the first display device 101 and output the content.

In this case, the content may include a real time broadcast transmitted by a broadcasting station, image and audio data transmitted from an external device, and image and audio data transmitted from a network.

In addition, the image data may refer to data including information on the content, and the second display device 102 may receive the image data, process the image data into data that can be output by the second display device 102 and output corresponding content.

That is, pieces of content may be provided from the first display device 101, and the second display device 102 may provide the content to the user through the first display device 101.

According to an embodiment of the present disclosure, the "user inputs corresponding to connection" between the first display device 101 and the second display device 102 may be provided in the form of an application mounted on the display device.

When the connection is completed in each display device, the application may be terminated.

Figure 6:
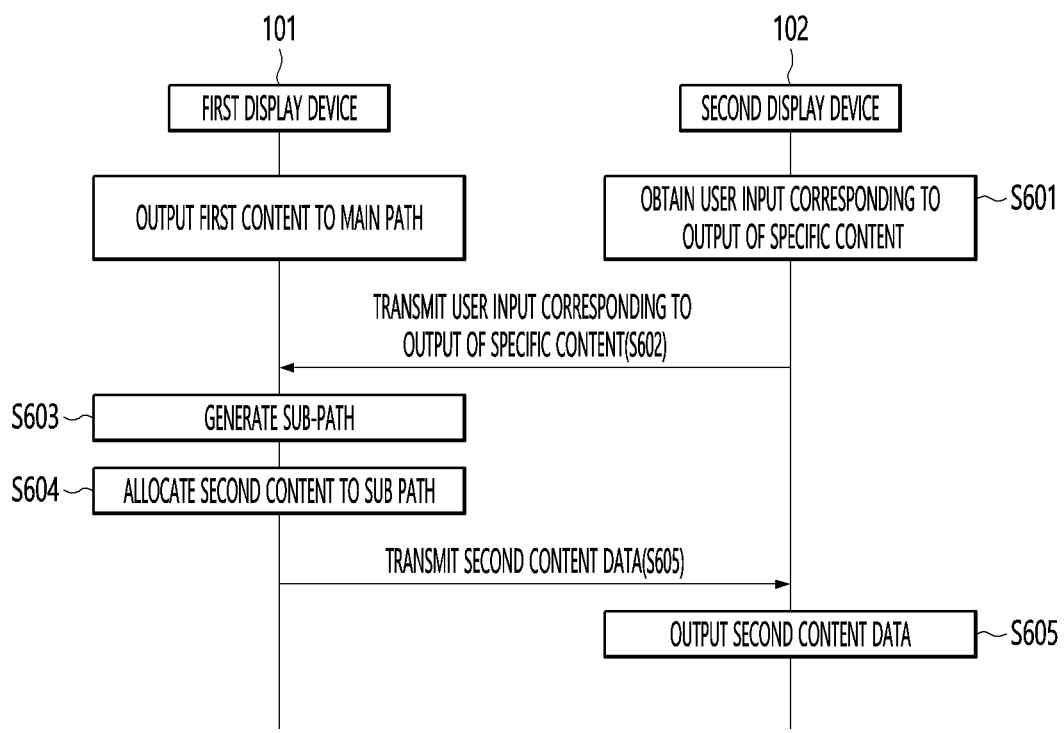
FIG. 6 is a flowchart showing a process of outputting different pieces of content in a plurality of display devices according to an embodiment of the present disclosure.

FIG. 6 is a flowchart showing a process of outputting different pieces of content in a plurality of display devices according to an embodiment of the present disclosure.

Referring to FIG. 6, the wireless communication interface 173_1 of the first display device 101 may communicate with the wireless communication interface 173_2 of the second display device 102. For example, the first display device 101 and the second display device 102 may be connected to each other through the process described with reference to FIG. 5.

The first display device 101 may be connected to a broadcasting station or an external device, and may receive specific content information through any one of the broadcast reception module 130_1, the network interface 133_1, and the external device interface 135_1.

In this case, specific content may further include any one of a real-time broadcast, image data provided from a set-top box, and image data input from any one of HDMI, Composite, and Component.

The first display device 101 may output first content among specific content through the display 180_1.

The user may input "a user input corresponding to output of specific content" to the second display device 102 through input of a specific button provided in the remote control device 200 or the second display device 102.

The second display device 102 may receive a user input corresponding to the output of specific content (S601).

Specifically, the user input corresponding to output of specific content may mean an operation of directly inputting, by the user, a button for selecting specific content through a user input interface 150_2 of the second display device 102 or an operation of inputting, by the user, a button for selecting specific content using the remote control device 200.

For example, the display 180_2 of the second display device 102 may output "real time broadcast" and "HDMI" provided by the first display device 101 as external input information. In this case, the real time broadcast and the HDMI may refer to specific content provided by the first display device 101.

The user may select the real time broadcast or the HDMI provided by the first display device 101 by using the remote control device 200.

Thereafter, when a user input corresponding to output of specific content output is received, a controller 170_2 of the second display device 102 may transmit the corresponding user input to the first display device 101 through the wireless communication interface 173_2 (S602).

The wireless communication interface 173_1 of the first display device 101 may receive the user input transmitted from the second display device 102.

According to an embodiment of the present disclosure, the first display device 101 may allocate the specific content to be provided to the second display device 102 to another path according to whether the specific content is currently being output to the display 180_1. Details will be described below.

The controller 170_1 of the first display device 101 may identify the presence or absence of the specific content currently output through the display 180_1.

When the content output through the display 180_1 does not exist, the controller 170_1 of the first display device 101 may transmit a command corresponding to output of specific content received from the second display device 102 to an external device (a broadcasting station, a network and an external device that provide content).

The external device may transmit data on the specific content requested from the first display device 101 to the first display device 101.

The controller 170_1 of the first display device 101 may transmit the data on the specific content received to the second display device 102.

In addition, the first display device 101 may support the second display device 102 such that the display 180_2 of the second display device 102 outputs the specific content by transmitting the data on the specific content to the second display device 102.

The controller 170_2 of the second display device 102 may output the received specific content through the display 180_2.

Hereinafter, a case in which specific content is being output from the first display device 101 will be described.

According to an embodiment of the present disclosure, the first display device 101 may output first content through the display 180_1.

In addition, when outputting the first content, the controller 170_1 of the first display device 101 may receive a user input corresponding to output of second content from the second display device 102 (S602).

The first display device 101 may generate a sub-path for transmitting the second content data to the second display device 102 (S603).

Specifically, the specific content may mean first content and second content different from the first content.

The controller 170_1 of the first display device 101 may allocate the first content output through the display 180_1 to a main path and generate a sub-path for allocating second content data (S604).

Specifically, the main path and the sub-path may mean a route through which an operation of processing content data in order to output the content data received from an external device through the display is performed.

For example, it is assumed that the first content is "real time broadcast on a first channel" provided by a broadcasting station and the second content is "real time broadcast on a second channel" provided by the broadcasting station.

In this case, the first display device may include a first tuner, a second tuner, a first demodulator and a second demodulator.

The first display device 101 may receive a tuned broadcast signal for the first content using the first tuner and the first demodulator. The first demodulator may separate the received broadcast signal into a video signal, an audio signal, and a data signal related to a broadcast program, and restore the separated video signal, audio signal, and data signal to a format capable of being output.

In this case, the main path may mean a route through which the first content is processed, including the first tuner and the first demodulator.

In addition, the first display device 101 may receive a tuned broadcast signal for the second content using the second tuner and the second demodulator. The second demodulator 132 may separate the received broadcast signal into a video signal, an audio signal, and a data signal related to a broadcast program.

In this case, the sub-path may mean a route through which the second content is processed, including the second tuner and the second demodulator.

The controller 170_1 of the first display device 101 may transmit a video signal, an audio signal, and a data signal allocated to a sub-path to the second display device 102 through a wireless communication interface.

On the other hand, the above example is an embodiment of the present disclosure, and a broadcast image input through the tuner, an external input image input through the external device interface 135, an image input through the network interface, or an image stored in a storage or the like may also be provided to the second display device 102 in the above manner.

The second display device 102 may output the obtained second content through the display 180_2 (S605).

Through the above process, the first display device 101 may output the first content and simultaneously transmit the second content allocated to the sub-path to the second display device 102 to support the second display device 102 such that the second display device 102 outputs the second content.

Accordingly, the second display device 102 may output the second content.

Figure 7:
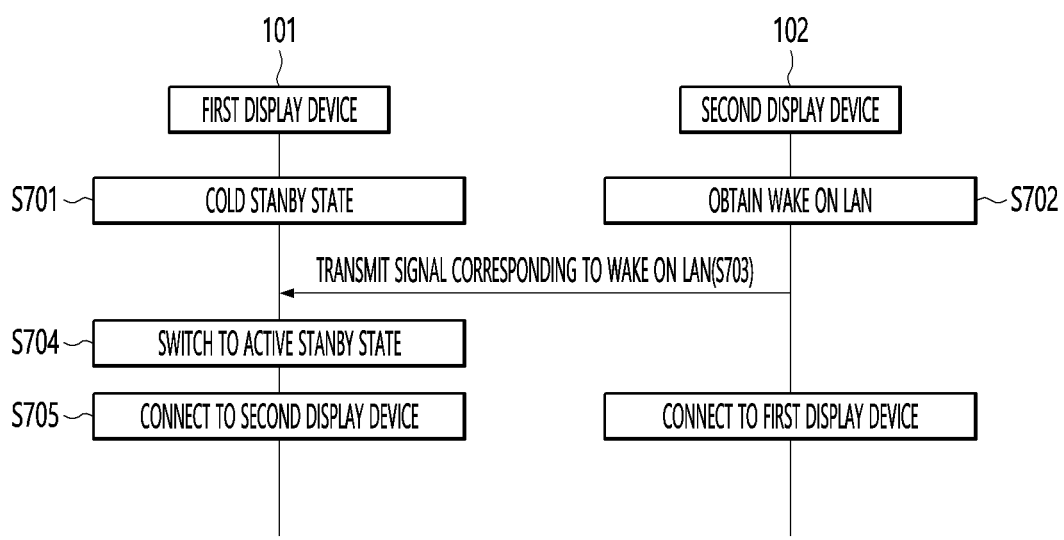
FIG. 7 is a flowchart showing a process of controlling a first display device using a second display device according to an embodiment of the present disclosure.

FIG. 7 is a flowchart showing a process of controlling a first display device using a second display device according to an embodiment of the present disclosure.

When a user uses a plurality of display devices, a power supply of at least one display device may be turned off.

In this case, when the first display device 101 that provides content is in an OFF state, a user who uses the second display device 102 may not be provided with content.

Therefore, the user may control the second display device 102 to turn on the first display device 101 and connect the second display device 102 and the first display device 101 for communication to receive content from the first display device 101.

Hereinafter, a method of activating a connection for providing content by turning on the power supply of the first display device 101 using the second display device 102 is disclosed in FIG. 7.

FIG. 7 is a flowchart showing a process of turning on the power supply of the first display device 101 using the second display device 102 when the power supply of the first display device 101 is turned off.

According to an embodiment of the present disclosure, the first display device 101 may be in a COLD-STANBY state. In this case, the COLD-STANBY state may include a state in which only the wireless communication interface 173_1 of the first display device 101 is activated, and other components are deactivated.

For example, in the COLD-STANBY state, the wireless communication interface 173_1 of the first display device 101 may receive content-related data, but the controller 170_1 cannot process or transmit the content-related data because the controller 170_1 is in an deactivated state.

In a case where the first display device 101 is in the COLD-STANBY state, when a preset signal is received through the wireless communication interface 173_1, the first display device 101 may switch to an ACTIVE-STANBY state. The ACTIVE-STANBY state may mean a state in which the display 180_1 of the first display device 101 is turned off, and all other components are activated.

For example, in the ACTIVE-STANBY state, the wireless communication interface 173_1 of the first display device 101 may receive content-related data, and the controller 170_1 is also in an activated state so the controller 170_1 can process or transmit the content-related data. Since the user watches content through the second display device 102, the display 180_1 of the first display device 101 may not need to be turned ON.

That is, the COLD-STANBY state may mean a state in which only commands for turning on/off the power supply of the display device can be received through the wireless communication interface, and the ACTIVE-STANBY state may mean a state in which all operations can be performed while the display being maintained in a turned-off state.

In a state where the first display device 101 is in the COLD-STANBY state, when the user wants to receive the first content that the first display device 101 can provide, through the second display device 102, the user may provide a user input corresponding to Wake On LAN.

The second display device 102 may receive a signal corresponding to Wake On LAN from the user (S702).

The second display device 102 may transmit a signal corresponding to the Wake On LAN to the first display device 101 through the wireless communication interface 173_2 (S703).

The controller 170_1 of the first display device 101 may switch to the ACTIVE-STANBY state when a Wake On LAN signal is received from the second display device 102 (S704).

The first display device 101 and the second display device 102 may be connected to each other through the process described with reference to FIG. 5 (S705). Alternatively, When there is a history that connection has been made previously, it is possible to directly perform connection without the process of FIG. 5.

On the other hand, the controller 170_2 of the second display device 102 may identify whether or not the second display device 102 is connected to the first display device 101, and when the state in which the second display device 102 is not connected to the first display device 101 continues for a predetermined time or longer, output a connection failure notification through the display 180_2.

Thereafter, when the first display device 101 and the second display device 102 are connected, the second display device 102 may output specific content through the process described with reference to FIG. 6.

Figure 8:
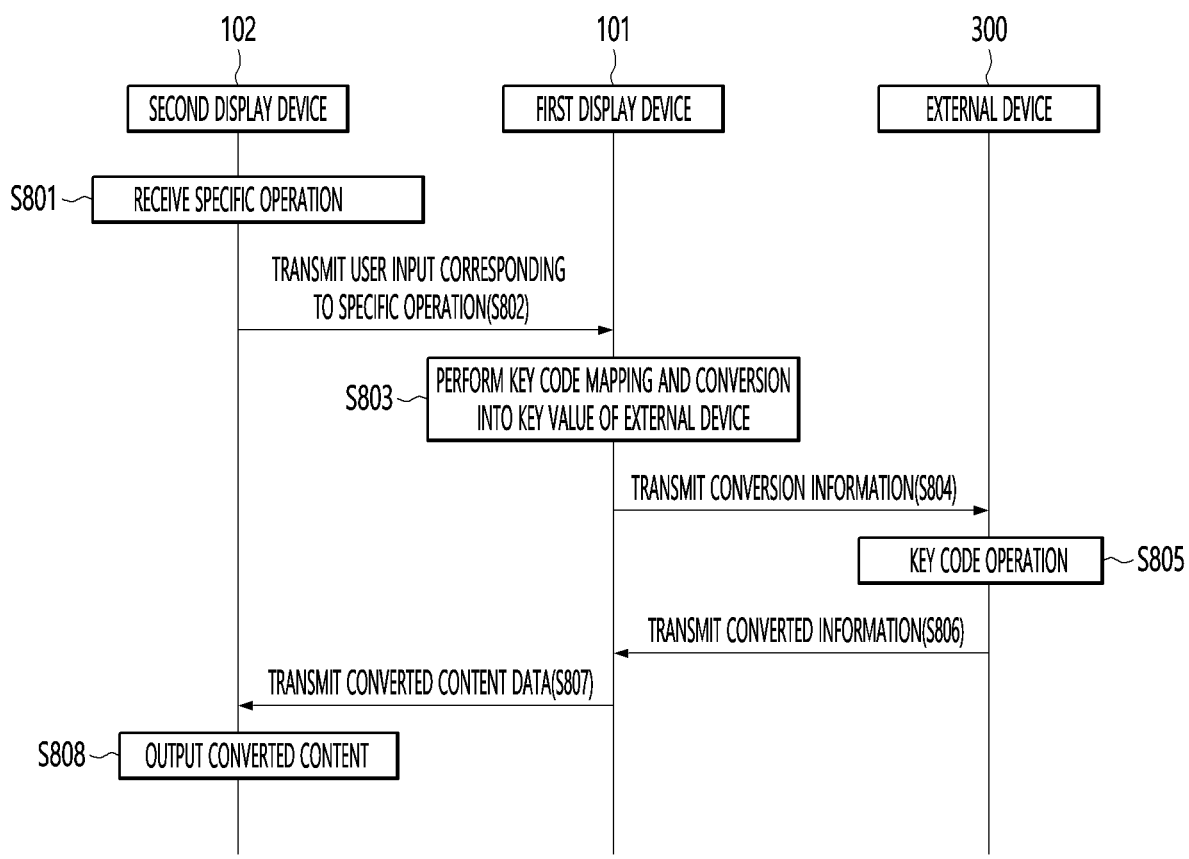
FIG. 8 is a flowchart showing a process of controlling a first display device using a second display device according to an embodiment of the present disclosure.

FIG. 8 is a flowchart showing a process of controlling a first display device using a second display device according to an embodiment of the present disclosure.

FIG. 8 is a flowchart for describing an operation of controlling the first display device 101 connected to an external device using the second display device 102.

Referring to FIG. 8, the second display device 102 may receive a user input corresponding to a specific operation (S801). In this case, the user input corresponding to the specific operation may include at least one of channel switching, volume change, and specific content change.

The specific operation may be generated from the remote control device 200 or may be generated when a user directly selects a specific button of the second display device.

The controller 170_1 of the second display device 102 may transmit a user input corresponding to the specific operation received through the wireless communication interface to the first display device 101 (S802).

The first display device 101 may receive data on a corresponding specific operation through the wireless communication interface 173_1.

When a user command corresponding to a specific operation is received from the second display device 102 through the wireless communication interface 173_1, the controller 170_1 of the first display device 101 may apply an operation corresponding to the specific operation to the specific content.

Specifically, the controller 170_1 of the first display device 101 may perform key code mapping for converting a command corresponding to a received specific operation into a specific command.

That is, the controller 170_1 of the first display device 101 may perform mapping for converting a key code corresponding to a specific operation into a key value of a connected external device (S803).

In this case, Key Code Mapping information may be converted using an algorithm or a mapping table stored in the storage 140 of the display device.

The controller 170_1 of the first display device 101 may transmit the converted key value to the external device (S804). In this case, the external device may include a broadcasting station providing a real time broadcast, a device providing an external input (including HDMI, composite, and component), and a network.

The external device may provide information on specific content on which the specific operation is performed to the first display device 101 by using the converted key value (S805 and S806).

For example, it is assumed that the external device is an HDMI input and a specific operation is "channel up".

The controller 170_1 of the first display device 101 may convert a channel up command into a key code corresponding to "channel up" according to a key code map previously stored in the storage 140_1.

For example, when the command corresponding to the "channel up" command in the key code map is "Fast Forward On" in the external device, the external device providing HDMI may operate an operation of turning on fast forward which corresponds to the received key value.

The present disclosure may control an external device connected to the first display device 101 using the second display device 102 through the above process.

As another example, when the external device is a broadcasting station and the specific operation is "channel up", the controller 170_1 of the first display device 101 may execute a command corresponding to "channel up" according to a pre-stored key code map and change a channel.

The first display device 101 may transmit the specific content on which the specific operation is performed to the second display device 102 (S807).

Through the above process, the second display device 102 may output data on the specific content on which the specific operation is performed (S808).

Figure 9:
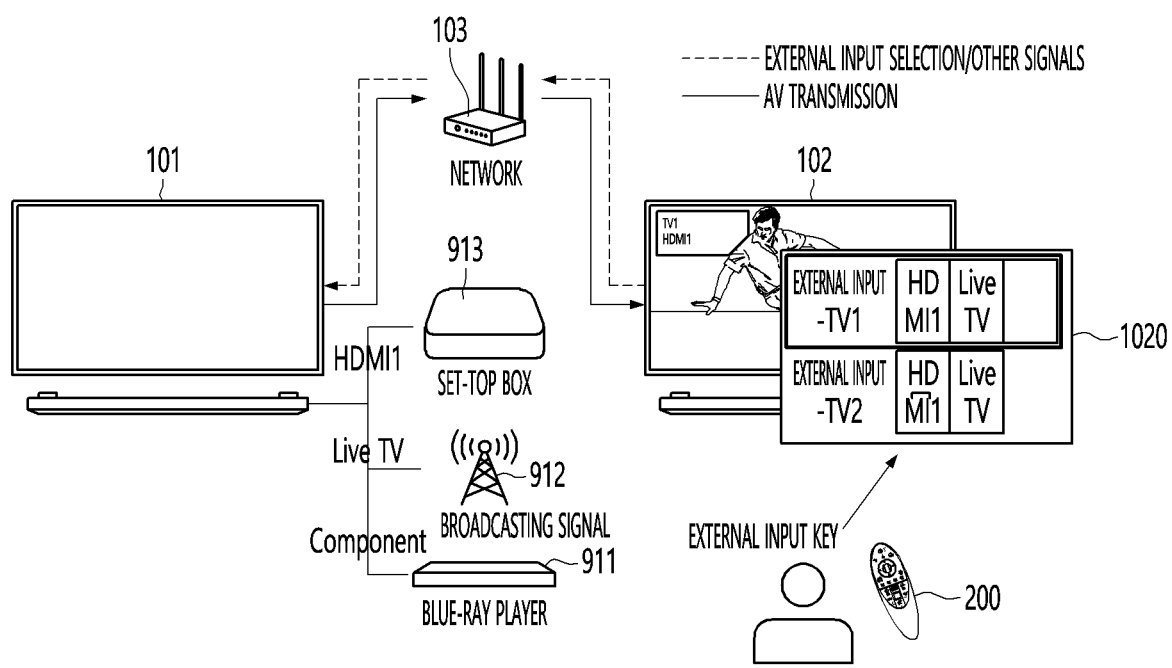
FIG. 9 is a diagram showing an example of use according to an embodiment of the present disclosure.

FIG. 9 is a diagram showing an example of use according to an embodiment of the present disclosure.

FIG. 9 is a diagram showing a process of outputting specific content in the process of FIG. 6 as an example.

Referring to FIG. 9, the second display device 102 may output a specific content list 1020 including content provided by the first display device 101 and content provided by the second display device 102.

The user may select content provided by the first display device 101 by using the remote control device 200. In this case, the content provided by the first display device 101 may be provided as an external input of the first display device 101.

The user may select content provided through an external input of the first display device 101 using a specific button of the remote control device 200.

When a user command corresponding to output of second content of the specific content list is received, the second display device 102 may request data on the second content from the first display device 101 through the wireless communication interface.

In general, a request for the second content may be made through the network 103, and the first display device 101 and the second display device 102 may be directly connected to each other.

The first display device 101 may communicate with an external device to receive information on the second content. For example, a set-top box 913 may be connected via HDMI to provide the specific content. In addition, the broadcasting station 912 may provide a real time broadcast by transmitting a broadcasting signal. In addition, a Blu-ray player 911 may be connected as a component to provide a Blu-ray quality video.

The first display device 101 may provide information on the second content to the second display device 102, and the second display device 102 may output the corresponding content through the display.

Figure 10:
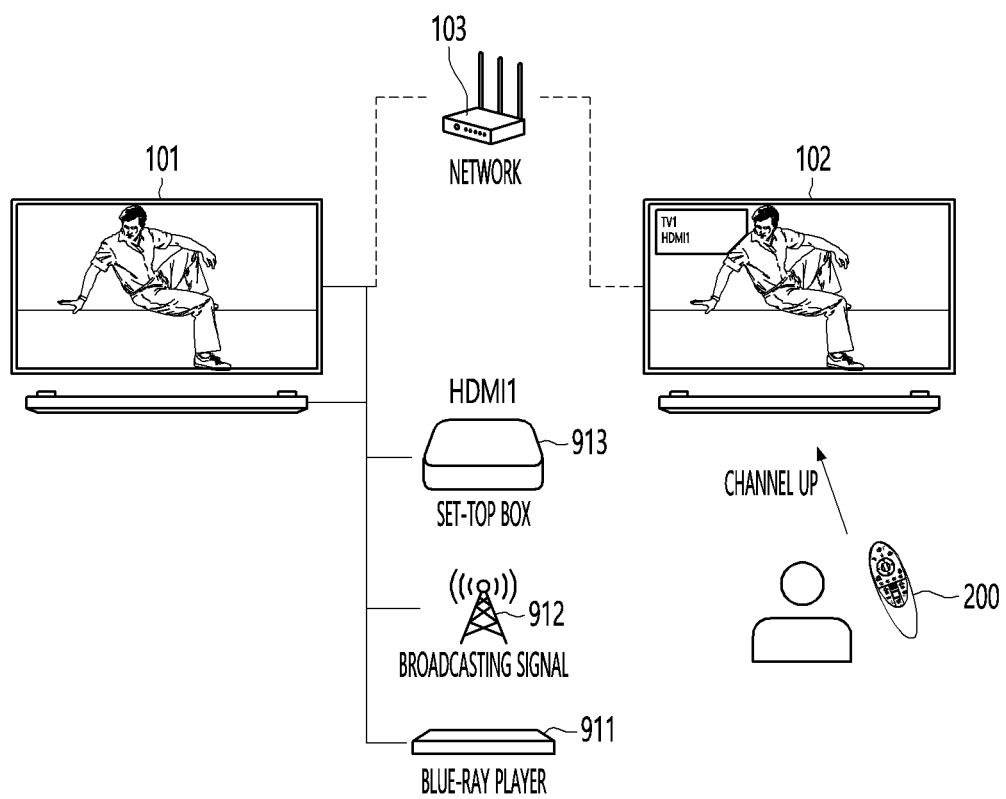
FIG. 10 is a diagram showing an example of use according to an embodiment of the present disclosure.

FIG. 10 is a diagram showing an example of use according to an embodiment of the present disclosure.

FIG. 10 is a diagram showing a process of performing key code mapping during the process of FIG. 8 as an example.

For example, when the second display device 102 is outputting specific content provided from the set-top box 913, the second display device 102 may receive a channel up command from a user.

The second display device 102 may transmit a channel up command signal to the first display device 101.

The first display device 101 may convert a key code corresponding to "channel up" into a command recognizable by the set-top box 913 according to a key code map previously stored in a storage.

For example, when the command corresponding to the "channel up" command in the key code map is "fast forward On" in the set-top box 913, the set-top box 913 may perform the fast forward On operation on the content corresponding to the received key.

The first display device 101 may receive information on specific content on which a fast forward operation is performed from the set-top box 913 and transmit the information to the second display device 102.

The second display device 102 may output content on which the fast forward operation is performed.

Through the above-described operation, the user may watch content connected to the first display device 101 through the second display device 102 of the present disclosure.

Meanwhile, a method of operating a system including a first display device 101 providing specific content and a second display device 102 connected to the first display device 101, according to the present disclosure may include receiving, by the first display device 101, a user command corresponding to output of the specific content to the second display device 102, and transmitting data on the specific content to the second display device 102 to support the second display device 102 such that the second display device 102 outputs the specific content.

In addition, the method may further include outputting, by the first display device 101, first content of the specific content, receiving, by the first display device 101, a user command corresponding to output of second of second content of the specific content from the second display device 102, allocating, by the first display device 101, the first content to a main path and the second content to a sub-path and transmitting, by the first display device, data on the second content allocated to the sub-path to the second display device 102 to support the second display device 102 such that the second display device 102 outputs the second content.

In addition, the method of the present disclosure may further include receiving, by the first display device 101, a user command corresponding to a specific operation from the second display device 102, applying, by the first display device 101, an operation corresponding to the specific operation, and transmitting, by the first display device 101, the specific content on which the specific operation is performed to support the second display device 102 such that the second display device 102 outputs the specific content on which the specific operation has been performed.

In addition, the method may further include receiving, by the second display device 102 receiving data on the specific content and outputting the specific content.

The present disclosure may provide the content to a second display device that is not connected to an external device and a broadcasting station by receiving processed content from a first display device connected to the external device and the broadcasting station.

According to the present disclosure, it is possible to provide a user with convenience for connection to the external device and the broadcasting station by not connecting the second display device to the external device and the broadcasting station.

The present disclosure may provide an economic benefit to a user by not connecting the second display device to an external device and a broadcasting station.

According to the present disclosure, it is possible to provide different pieces of content to a plurality of display devices using a main path and a sub path.

The present disclosure may be embodied as computer-readable codes on a program-recorded medium. The computer-readable recording medium may be any recording medium that stores data which can be thereafter read by a computer system. Examples of the computer-readable medium may include hard disk drive (HDD), solid state disk (SSD), silicon disk drive (SDD), read-only memory (ROM), random-access memory (RAM), CD-ROM, a magnetic tape, a floppy disk, and an optical data storage device. In addition, the computer may include the controller 170 of the display device 100. Accordingly, the above detailed description should not be construed as being restrictive in all respects and should be considered illustrative. The scope of the present specification should be determined by rational interpretation of the appended claims, and all changes within the equivalent scope of the present specification fall within the scope of the present specification.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

Each of the embodiments disclosed in this specification may be implemented alone, or in combination with other embodiments.

The scope of protection of the present disclosure should be interpreted by the appending claims, and all technical ideas within the scope of equivalents should be construed as falling within the scope of the present disclosure.

What is claimed is:

1. A display device comprising:
a wireless communication interface configured to communicate with an external device comprising a set-top box and to communicate with another display device that lacks a direct connection to the external device comprising the set-top box;
a display; and
a controller configured to:
output a list of specific content for display at the other display device, the specific content including first broadcast content broadcast on a first broadcast channel and second broadcast content broadcast on a second broadcast channel;
allocate the first broadcast content to a main path;
output, through the display, the first broadcast content allocated to the main path; and
based on receiving, from the other display device, a request relating to a user command corresponding to output of the second broadcast content:
receive, from the external device, information on the second broadcast content;
allocate the second broadcast content to a sub-path; and transmit, to the other display device, the second broadcast content allocated to the sub- path such that the second broadcast content, excluding the first broadcast content, is output at the other display device concurrent with the output of the first broadcast content, excluding the second broadcast content, through the display,
wherein the main path and the sub-path are routes through which an operation of processing data on the specific content is performed so that the specific content is output.

2. The display device of claim 1, wherein the specific content includes real time broadcast data content, high-definition multimedia interface (HDMI) content, or image data input from any one of Composite or Component.

3. The display device of claim 1, wherein the controller is further configured to switch to an active-standby state when a Wake on Lan signal is received from the other display device through the wireless communication interface when the display device is in a cold-standby state.

4. The display device of claim 3, wherein the cold-standby state is a state in which the display device is capable of receiving only a command for turning on/off a power supply of the display device through the wireless communication interface, and
wherein the active-standby state is a state in which all operations of the display device are able to be performed while the display is maintained in an off state.

5. The display device of claim 1, wherein the controller is further configured to:
apply an operation corresponding to a specific operation to the specific content when a user command corresponding to the specific operation is received from the other display device through the wireless communication interface; and
transmit the specific content on which the specific operation is applied to the other display device,
wherein the specific operation includes channel switching, volume change, or specific content change.

6. A display device comprising:
a wireless communication interface configured to communicate with an external device comprising a set-top box and to communicate with another display device that lacks a direct connection to the external device comprising the set-top box;
a display; and
a controller configured to:
allocate first broadcast content device broadcast on a first broadcast channel to a main path;
output, through the display, the first broadcast content allocated to the main path; and
based on receiving, from the other display device, a request relating to a user command corresponding to output of second broadcast content broadcast on a second broadcast channel:
receive, from the external device, information on the second broadcast content; and
transmit, to the other display device, the second broadcast content allocated to the sub- path such that the second broadcast content, excluding the first broadcast content, is output at the other display device concurrent with the output of the first broadcast content, excluding the second broadcast content, through the display,
wherein the main path and the sub-path are routes through which an operation of processing data on specific content is performed so that the specific content is output.

7. The display device of claim 6, wherein the controller is further configured to:
- output a list of the specific content for display at the other display device, wherein the specific content includes the second content; and
- request data on the second content from the other display device through the wireless communication interface when the user command corresponding to output of the second content is received.

8. The display device of claim 7, wherein the controller is further configured to output the second content based on the data on the second content when the data is received through the wireless communication interface.

9. The display device of claim 6, wherein the controller is further configured to transmit a user command corresponding to a specific operation to the other display device through the wireless communication interface and output data on the specific content on which the specific operation is performed when the user command corresponding to the specific operation is received through a user input interface in a case in which the specific content is output through the display.

10. The display device of claim 6, wherein the controller is further configured to:
- identify whether the display device is connected to the other display device; and
- output a connection failure notification through the display when a state of not being connected to the other display device continues for more than a preset time.

11. A method of operating a system including a first display device configured to communicate with an external device comprising a set-top box and a second display device connected to the first display device and lacking a direct connection to the external device comprising the set-top box, the method comprising:
- outputting, by the first display device, a list of specific content for display at the second display device, the specific content including first broadcast content broadcast on a first broadcast channel and second broadcast content broadcast on a second broadcast channel;
- allocating, by the first display device, the first broadcast content to a main path;
- outputting, by the first display device, the first broadcast content allocated to the main path; and
- based on receiving, by the first display device from the second display device, a request relating to a user command corresponding to output of the second broadcast content:
- receiving, by the first display device from the external device, information on the second broadcast content; and
- transmitting, by the first display device to the second display device, the second broadcast content allocated to the sub-path such that the second broadcast content, excluding the first content, is output at the second display device concurrent with the output of the first broadcast content, excluding the second broadcast content, by the first display device, wherein the main path and the sub-path are routes through which an operation of processing data on the specific content is performed so that the specific content is output.

12. The method of claim 11, further comprising:
- receiving, by the first display device, a user command corresponding to a specific operation from the second display device;
- applying, by the first display device, an operation corresponding to the specific operation on the specific content; and
- transmitting, by the first display device, the specific content on which the specific operation is applied to support the second display device such that the second display device outputs the specific content on which the specific operation has been applied.

13. The method of claim 11, further comprising:
- receiving, by the second display device, data on the specific content; and
- outputting, by the second display device, the specific content.

* * * * *